United States Patent
Yabuta et al.

(10) Patent No.: US 7,602,813 B2
(45) Date of Patent: Oct. 13, 2009

(54) DECODER DEVICE

(75) Inventors: Tetsutaka Yabuta, Daito (JP); Kazuhiro Ieda, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 645 days.

(21) Appl. No.: 11/137,482

(22) Filed: May 26, 2005

(65) Prior Publication Data

US 2005/0265254 A1    Dec. 1, 2005

(30) Foreign Application Priority Data

Jun. 1, 2004    (JP)    ............................. 2004-163042

(51) Int. Cl.
*H04J 3/06*    (2006.01)

(52) U.S. Cl. ..................................... 370/503

(58) Field of Classification Search ................ 370/503, 370/507, 538, 442, 535; 386/46, 98, 124, 386/94; 713/193
See application file for complete search history.

(56) References Cited

U.S. PATENT DOCUMENTS

| | | | | |
|---|---|---|---|---|
| 7,120,170 | B2* | 10/2006 | Ali et al. | 370/503 |
| 2002/0076196 | A1* | 6/2002 | Nagata et al. | 386/46 |
| 2003/0051151 | A1* | 3/2003 | Asano et al. | 713/193 |
| 2003/0147426 | A1* | 8/2003 | Cronin et al. | 370/503 |
| 2003/0215213 | A1* | 11/2003 | Sakamoto | 386/46 |
| 2004/0047612 | A1* | 3/2004 | Nagata et al. | 386/98 |
| 2005/0105886 | A1* | 5/2005 | Abelard et al. | 386/94 |
| 2005/0259946 | A1* | 11/2005 | Kitamura | 386/46 |

FOREIGN PATENT DOCUMENTS

| | | |
|---|---|---|
| JP | 08-116532 A | 5/1996 |
| JP | 11-018049 A | 1/1999 |
| JP | 2000-217080 A | 8/2000 |
| JP | 2003-188865 A | 7/2003 |
| JP | 2003-348485 | 12/2003 |

OTHER PUBLICATIONS

Japanese Office Action dated Jul. 5, 2007 issued in corresponding Application No. 2004-163042.

* cited by examiner

*Primary Examiner*—Kwang B Yao
*Assistant Examiner*—Syed Bokhari
(74) *Attorney, Agent, or Firm*—Westerman, Hattori, Daniels & Adrian, LLP.

(57) ABSTRACT

A decoder device is provided which is able to output audio and video in sync without a counter synchronized with a clock reference value. The decoder device retrieves PES and PCR from TS, and decides the timing of an audio output section and a video output section, referring to PTS appended to the PES. A local counter output section counts in a predetermined count-up cycle without an adjustment control on the PCR. A PCR & local-counter list management section generates a table paring up a counter value, when the PCR is received, with the PCR. The audio & video output sections calculate a latency time of an access unit, using both a first difference, which is between a counter value, when PTS is referred to, and the counter value in the table, and of a second difference, which is between PTS of PES and the PCR in the table.

13 Claims, 3 Drawing Sheets

(a)

(b)

2

DECODER DEVICE

CROSS REFERENCE TO RELATED APPLICATIONS

This application is based upon and claims priority of Japanese Patent Application No. 2004-163042, the contents of which are incorporated herein by reference.

BACKGROUND OF THE INVENTION

1. Field of the Invention

The present invention relates to a decoder device used for example with a digital broadcasting receiver.

2. Description of the Related Art

FIG. 3 is an illustration showing a structure outline of a conventional digital broadcasting receiver. Concerning a digital broadcasting, in the case that audio and video (AV) are output in sync, it is necessary to time them to output them with comparing PTSs (Presentation Time Stamp), which are included in audio and video PES packets, with Local PCR (Local Program Clock Reference) value.

A concrete conventional method to time them is explained below referring to FIG. 3. TS (Transport Stream), which is derived by demodulating a digital broadcasting wave, includes a packet which describes a PCR. A receiver has a software/hardware Local PCR counter to count up in every PCR cycle (27 MHz). Because some gap between the Local PCR counter value and the PCR value in the digital broadcasting wave arises, the Local PCR is synchronized by a PLL (Phase Locked Loop) adjustment section in FIG. 3 referring to the PCR value in the digital broadcasting wave.

TS packets of AV data are included in the TS, and PES (Packetize Elementary Stream) packets of AV data are derived from these TS packets. PTS, which is time information to reproduce and output an access unit (a unit of decoded reproduction output) of the PES, is written in addition in the PES packets. In the case of using this method, a software/hardware Local PCR counter synchronized with a PCR of a broadcasting wave is a necessity (refer to the Japanese laid open patent TOKKAI 2003-348485).

However, it is possible that a digital broadcasting receiver is unable to have a Local PCR counter synchronized with a PCR of a broadcasting wave because of its hardware or software restriction.

SUMMARY OF THE INVENTION

In view of the foregoing circumstances, in accordance with embodiments of the present invention, a decoder device is provided which is able to output audio and video in sync without a counter synchronized with a clock reference value.

In order to solve the problems described above, the preferred embodiment of the invention of a decoder device which retrieves a packetized elementary stream and a clock reference value from a transport stream, and decides the timing of decoded reproduction output of the packetized elementary stream referring to a reproduction output time information appended to the packetized elementary stream while in a decoding reproduction process of the packetized elementary stream comprises followings: a counter for counting in a predetermined count-up cycle without an adjustment control based on the clock reference value, a table generation means for generating a table paring up a counter value at the time when the clock reference value is received with the clock reference value, a first difference information output for outputting first difference information between a counter value at the time when reproduction output time information of the packetized elementary stream is referred to and a counter value in the table, a second difference information output for outputting second difference information between reproduction output time information of the packetized elementary stream and a counter value in the table, and a latency time calculation device for calculating a latency time of the packetized elementary stream reproduction output from the first difference information and the second difference information (hereafter called "first composition" in this section).

In accordance with a preferred embodiment of the present invention, audio and video can be synchronized even if a counter synchronized with a clock reference value is not installed because the latency time of the packetized elementary stream reproduction output is calculated from the first difference information and the second difference information.

Further, on the first composition, the latency time calculation means also calculates two or more output latency times on all data in the table, and the least one among the output latency times is accepted. Alternatively, on the first composition, a datum whose value of reproduction output time information is greater than the clock reference value and whose value of the reproduction output time information the result of subtracting from the clock reference value is the least is selected, and a latency time is calculated on the basis of the selected datum.

Further, on these compositions of a decoder device, also, it has a first threshold, and the packetized elementary stream reproduction output is done immediately if a calculated output latency time is less than or equal to the first threshold, and even if the output latency time is not zero. Further, on the composition, if the condition where the calculated output latency time is greater than or equal to the first threshold and less than or equal to a second threshold is satisfied, the calculated output latency time on the condition is regarded as being valid, and if the condition is not satisfied, the packetized elementary stream is nullified as it is assumed that the calculated output latency time on the condition is invalid. Further, on the composition, even if the condition where the calculated output latency time is greater than or equal to the first threshold and less than or equal to a second threshold is satisfied, the packetized elementary stream might be nullified as it is assumed that the calculated output latency time on the condition is invalid under a predetermined condition.

As explained above, according to the preferred embodiment of the present invention, audio and video can be synchronized without a counter synchronized with a clock reference value.

BRIEF DESCRIPTION OF THE DRAWING

The above and other objects and advantages of the present invention will become apparent and more readily appreciated from the following description of the preferred embodiments taken in conjunction with the accompanying drawings, of which.

DETAILED DESCRIPTION OF THE PREFERRED EMBODIMENTS

Figure 1:
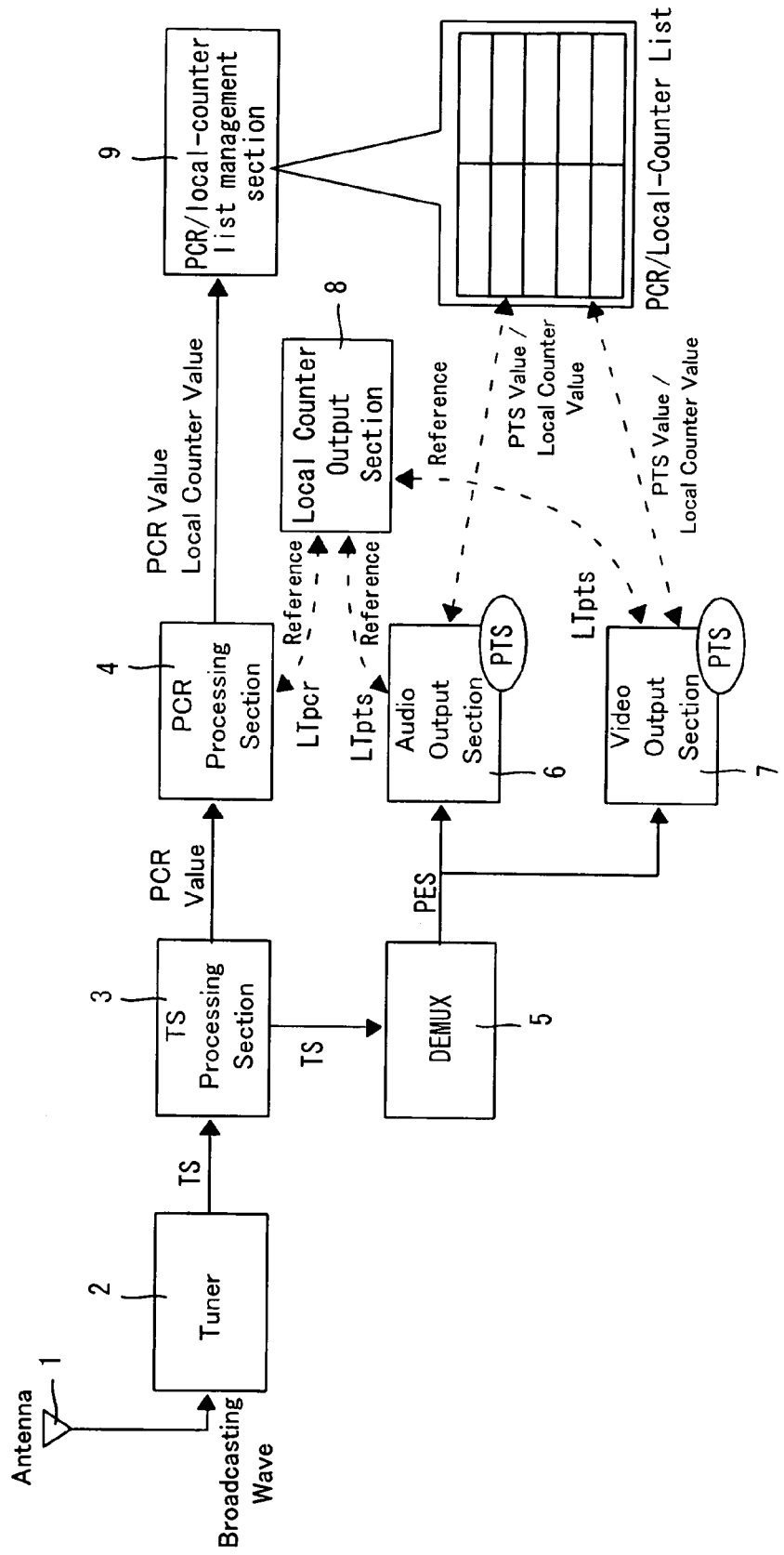
FIG. 1 is a block diagram showing a digital broadcasting receiver (a decoder device) in accordance with embodiments of the present invention.

Reference will now be made in detail to the preferred embodiments of the present invention, examples of which are illustrated in the accompanying drawings, wherein like reference numerals refer to like elements throughout.

Embodiment 1

Embodiments of the present invention, digital broadcasting receivers (decoder devices) will now be described below with reference to FIG. 1.

An antenna 1 receives a digital broadcasting wave which is sent from satellites or terrestrial broadcast stations. A digital tuner 2 extracts, out of high-frequency digital modulation signals including audio & video data, the digital modulation signal having a particular frequency. Moreover, the digital tuner 2 demodulates the selected digital modulation signal, to output a transport stream (TS), and detects and corrects an error in digital data.

A TS processing section 3 extracts a PCR value from the output transport stream and outputs the PCR value to a PCR processing section 4 as well as supplies a demultiplexer (DE-MUX) 5 with the transport stream. The demultiplexer 5 separates the transport stream into a video stream, an audio stream, etc.

The audio stream separated by the demultiplexer 5 (audio PES) is supplied to an audio output section 6, and the separated video stream is supplied to a video output section 7. The video output section 7 finds a quantization coefficient and a motion vector by decoding an input coded signal, and outputs a video datum after carrying out inverse DCT conversion and motion compensation control based on the motion vector, for example. On the other hand, the audio output section 6 generates an audio datum by decoding the output coded signal. In addition, these decoded reproduction outputs of the access unit should be synchronized with the PTS of the access unit under these processes.

A local counter output section 8 is a circuit to output a local count value which is being counted up with some cycle. The local counter output section 8 is not adjusted to the received PCR (it is not synchronized with the PCR).

A PCR processing section 4 receives a local count value which is at the time of receiving the PCR value, from the local counter output section 8. Then, the processing section outputs the PCR value and the datum of the local count value to a PCR & local-counter list management section 9.

The PCR & local-counter list management section 9 registers the data comprised of the PCR values and the local count values in a PCR & local-counter list.

The method of synchronizing output of AV (audio & video) data on the present invention is explained below. In the case that an access unit of AV data is reproduced, the PTS which is written in addition in the access unit is referred to as well as referring to the local counter value, and data-pairs of both the PTS values and the local counter values are generated sequentially. Then, each latency time to the decoded reproduction output of the access unit is calculated according to the data-pair, the counter value at the time of referring to PTS of the access unit, and PTS of the access unit. The least latency time of these calculated latency times is accepted, and the decoded reproduction is going to be output when the latency time elapses.

Hereafter, concrete processing is explained.

1. Generating a PCR & local-counter list: When the receiver receives a PCR, it refers to the local counter value at the time and generates a data-pair of both the PCR value and the local counter value. Then, the data-pair is added at the end of the PCR & local-counter list. The receiver operates the same each time when it receives a PCR.

2. Calculating a latency time of a decoded reproduction output of an access unit: The video output section 7 and the audio output section 6 obtain a local counter value at the time of referring to the PTS of the access unit (the counter value at this time is defined as "LTpts"), and then, the data of the PTS of the access unit and the LTpts are generated. Using these data and the data-pair of each item of the PCR & local-counter list, a latency time until the reproduction output is calculated by the calculus below.

The PCR comprises a Base counting up by 90 KHz, and an Extension (Ext) counting up 27 MHz. When the value of Ext becomes 300, the Base counts up by 1 and the Ext becomes 0. The Base is a counter of 33 bits, and the Ext is a counter of 9 bits. Similarly, the PTS counts up by 90 KHz. Therefore, the Base of the PCR and the PTS are objects to compare with.

A PCR value in the list is defined as "PCR_n", a local counter value is defined as "LTpcr_n", a PTS value of an access unit is defined as "PTS", a local counter value at the time of referring to a PTS of an access unit is defined as "LTpts", and the frequency of counting up of the local counter is defined as "Flt". Here, it is defined that N=1, 2, 3, ..., p−1, p (p is an integer).

Figure 2:
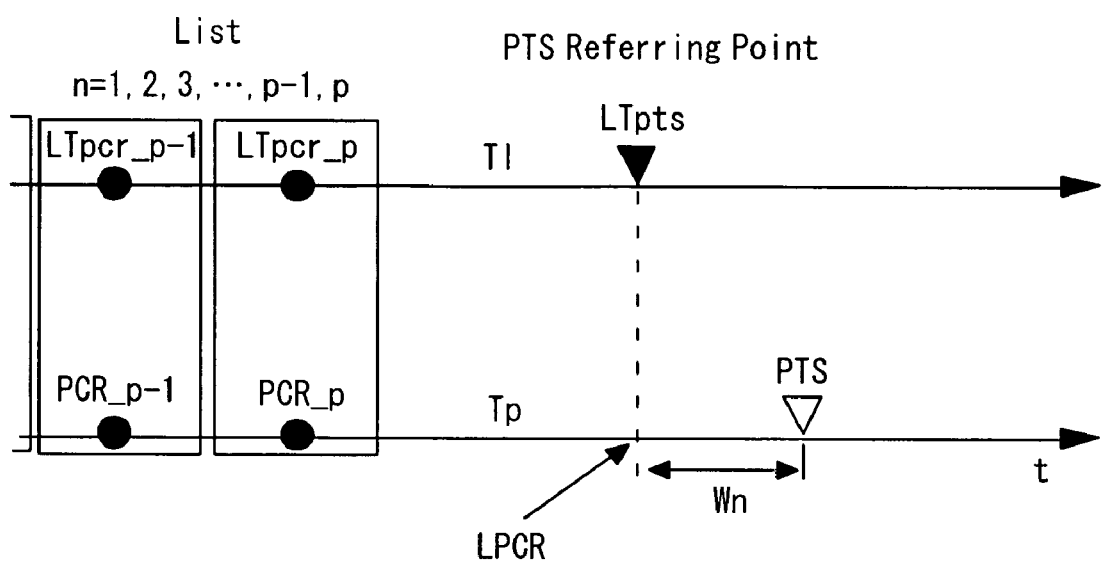
FIG. 2(a) is an illustration showing conceptual framework on calculating a latency time.
FIG. 2(b) is an illustration showing treatment of packets.
Figure 2:
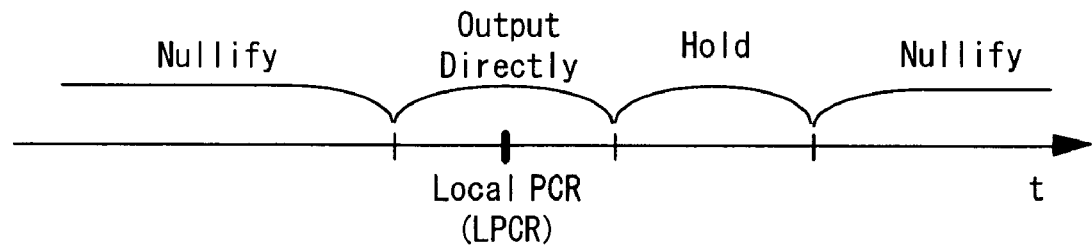
Figure 3:
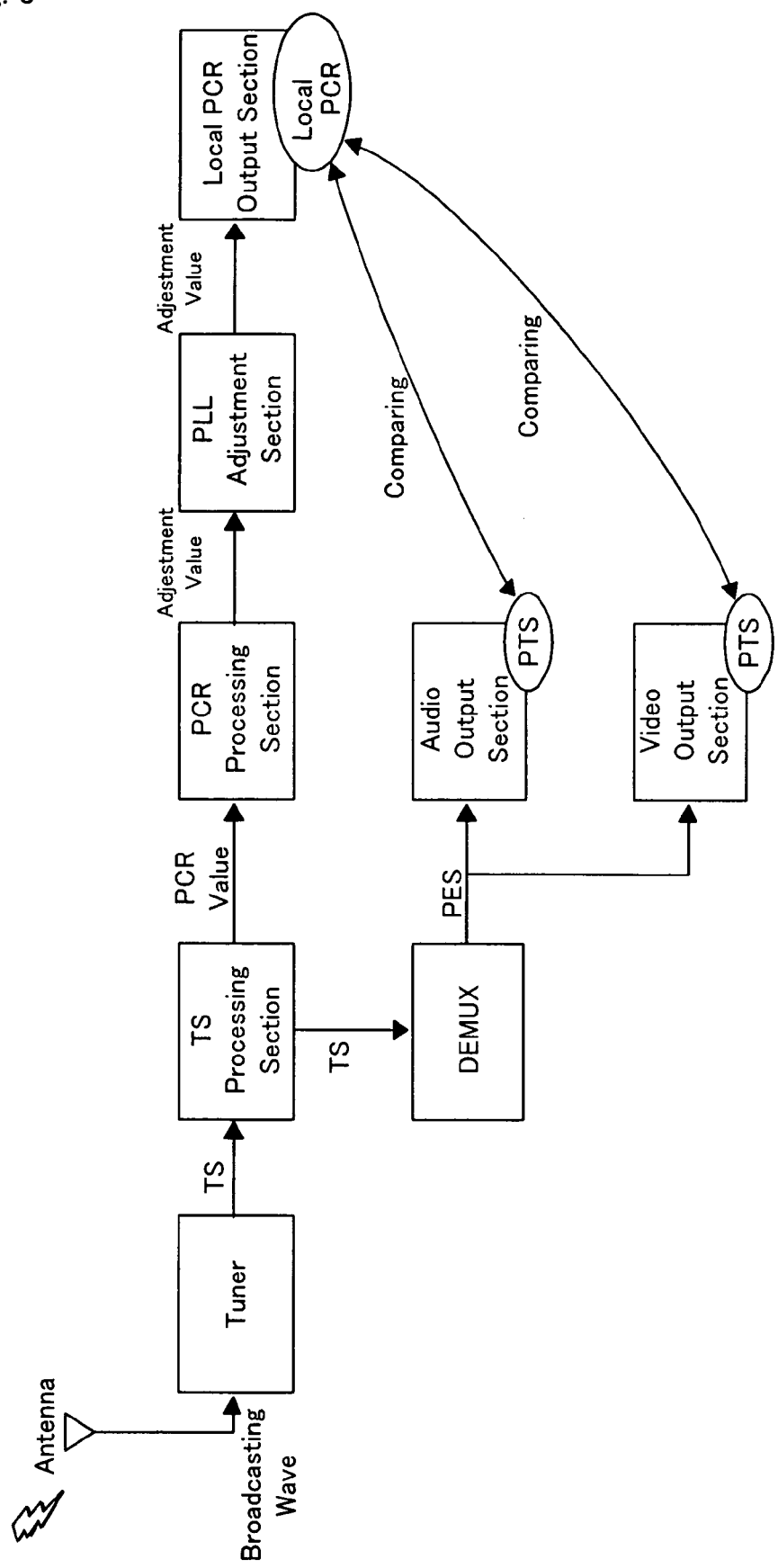
FIG. 3 is a block diagram showing a conventional digital broadcasting receiver.

FIG. 2 (a) illustrates the relation among a PCR & local-counter list, a local counter value at the time of referring to a PTS of an access unit (LTpts), difference "Tl", "PTS" on the access unit, difference "Tp", a latency time "Wn", and a local PCR value (LPCR), regarding the horizontal axis as a time axis.

First, "Tp" is worked out from the difference between a PCR value and the PTS value as a unit of ms (millisecond).

$$Tp=|PTS-PCR\_n|/90$$

Second, "Tl" is worked out from the difference between the local counter value at the time of referring to the PTS and "LTpcr_n" at the time of receiving the PCR as a unit of ms.

$$Tl=|LTpts-LTpcr\_n|\times 1000/Flt$$

Then, if the latency time until the access unit's reproduction output is defined as "Wn", $$Wn=|Tp-Tl|$$

Therefore, it means the latency time until the access unit's reproduction output is figured out.

3. How to decide the handling of the access unit: The video output section 7 and the audio output section 6 calculate "Wn"s, latency times until the access unit's reproduction output, against each of all items in the PCT/local-counter list, when a PTS of the access unit is referred to. The least latency time among the calculated latency times is going to be used as the latency time until the access unit's reproduction output.

Ideally, as long as it is handled the order of receiving TS, PTS is equal to or greater than PCR (PTS≧PCR) and these values of both of them are very close each other. However, there can be the case that the conditions mentioned above are not brought into existence because of the timing of the software processing, the problem of transmission, or the like.

Thereupon, the handling of the PES is decided according to the algorithm below against the calculated latency time. FIG. 2 (b) illustrates, with regard to the local PCR value (LPCR_n) as the touchstone, the time range where the access unit's reproduction is immediately output, the time range where the reproduction is held along the latency time, and the time range where the access unit is nullified.

A threshold "Pp", which is for deciding that the access unit's reproduction should be output immediately, and a threshold "Pw", which is for deciding that the latency time is effective to output the reproduction, are set up. "Pp" should be much less than "Pw" (Pp<<Pw).

When "Wn"≦"Pp", it is decided that the access unit's reproduction is immediately output even if "Wn"≠0.

When "Wn"≦"Pw", the handling of the access unit is decided according to the method showing below.

(1) calculate a local PCR value (LPCR_n) using the formula below $LPCR\_n = PCRn + 90 \times Tl$ (2) make a comparison between LPCR_n and PTS a) In the case of "PTS≧LPCR_n":

If "PTS" is not far apart "LPCR_n", it is decided that the latency time for the access unit's reproduction output is effective.

If "PTS" is far apart "LPCR_n", it is decided that the access unit is nullified.

b) In the case of "PTS<LPCR_n":

It is decided that the access unit is nullified in this case. However, the PTS and the PCR are counters of 33 bits, so it should be considered that they may overflow. Therefore, if "PTS" is far apart "LPCR_n", it is considered that the PTS has overflowed, so it is decided that it is in the state of waiting for the access unit's reproduction output. If not, it is decided that the access unit is nullified.

In the case of "Wn>Pw", it is decided that the access unit is nullified.

Embodiment 2

In the Embodiment 1, when the PTS of the access unit is referred to, "Wn"s, latency times until the access unit's reproduction output, are calculated against each of all items in the PCR & local-counter list. Then, the least latency time among the calculated latency times is going to be used as the latency time until the access unit's reproduction output.

Hereafter, another method of calculating a latency time of a decoded reproduction output of an access unit is explained.

The method of generating a PCR & local-counter list and the method of deciding the handling of the access unit are same as the Embodiment 1. The method of calculating a latency time of a decoded reproduction output of an access unit is also same as the Embodiment 1, but the method of choosing items of the list to use for the calculation of a latency time are different.

First, comparisons between all of the PCT values in the list and all of PTS values in the list are made. A PCR value in the list is defined as "PCR_n", a local counter value is defined as "LTpcr_n", a PTS value of an access unit is defined as "PTS", a local counter value at the time of referring to the PTS of the access unit is defined as "LTpts", and the frequency of counting up of the local counter is defined as "Flt".

Second, it choose an item which is "PCT_n<PTS", and where the value of "A" which derives from "A=|PCR_n-PT|" is the least. Against the chosen item in the list, the latency time until the access unit's reproduction output is calculated.

Third, as same as the Embodiment 1 explained above, "Tp" is worked out from the difference between the PCR value and the PTS value as a unit of ms.

$Tp = |PTS - PCR\_n|/90$

Fourth, "Tl" is worked out from the difference between the local counter value at the time of referring to the PTS and "LTpcr_n" at the time of receiving the PCR as a unit of ms.

$Tl = |LTpts - LTpcr\_n| \times 1000/Flt$

Then, if the latency time until the access unit's reproduction output is defined as "Wn", $Wn = |Tp - Tl|$ Therefore, it means that the latency time until the access unit's reproduction output is figured out.

Although latency times are calculated against each of all items of the list in the Embodiment 1 and the least latency time among them is looked for, only a latency time against an item is calculated in the Embodiment 2. Consequently, the computation time decreases drastically.

Although a few preferred embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A decoder device which retrieves a packetized elementary stream and a program clock reference value from a transport stream, and decides the timing of decoded reproduction output of the packetized elementary stream referring to a reproduction output time information appended to the packetized elementary stream while in a decoding reproduction process of the packetized elementary stream, the decoder device comprising:

a circuit that counts in a predetermined count-up cycle without being synchronized by an adjustment control based on the program clock reference value;

a table generation means for generating a table pairing up a counter value at the time when the program clock reference value is received with the program clock reference value;

a first difference information output for outputting first difference information between a counter value at the time when reproduction output time information of the packetized elementary stream is referred to and a counter value in the table;

a second difference information output for outputting second difference information between reproduction output time information of the packetized elementary stream and a counter value in the table; and a latency time calculation device for calculating a latency time of the packetized elementary stream reproduction output from the first difference information and the second difference information.

2. The decoder device according to claim 1, wherein the latency time calculation device calculates two or more output latency times on all data in the table, and the least one among the output latency times is accepted.

3. The decoder device according to claim 1, wherein a datum whose value of reproduction output time information is greater than the program clock reference value and whose value of the reproduction output time information the result of subtracting from the program clock reference value is the least is selected, and a latency time is calculated on the basis of the selected datum.

4. The decoder device according to claim 1, wherein the packetized elementary stream reproduction output is done immediately if a calculated output latency time is less than or equal to a first threshold, even if the output latency time is not zero.

5. The decoder device according to claim 2, wherein
the packetized elementary stream reproduction output is done immediately if a calculated output latency time is less than or equal to a first threshold, even if the output latency time is not zero.

6. The decoder device according to claim 3, wherein
the packetized elementary stream reproduction output is done immediately if a calculated output latency time is less than or equal to a first threshold, even if the output latency time is not zero.

7. The decoder device according to 4, wherein
if a condition where a calculated output latency time is greater than or equal to the first threshold and less than or equal to a second threshold is satisfied, a calculated output latency time on the condition is regarded as being valid, and
if the condition is not satisfied, a packetized elementary stream is nullified as it is assumed that a calculated output latency time on the condition is invalid.

8. The decoder device according to 5, wherein
if a condition where a calculated output latency time is greater than or equal to the first threshold and less than or equal to a second threshold is satisfied, a calculated output latency time on the condition is regarded as being valid, and
if the condition is not satisfied, a packetized elementary stream is nullified as it is assumed that a calculated output latency time on the condition is invalid.

9. The decoder device according to 6, wherein
if a condition where a calculated output latency time is greater than or equal to the first threshold and less than or equal to second threshold is satisfied, a calculated output latency time on the condition is regarded as being valid, and
if the condition is not satisfied, a packetized elementary stream is nullified as it is assumed that a calculated output latency time on the condition is invalid.

10. The decoder device according to 7, wherein
even if the condition where a calculated output latency time is greater than or equal to the first threshold and less than or equal to the second threshold, is satisfied, the packetized elementary stream becomes nullified as it is assumed that the calculated output latency time on the condition is invalid under a predetermined condition.

11. The decoder device according to 8, wherein
even if the condition where a calculated output latency time is greater than or equal to the first threshold and less than or equal to the second threshold, is satisfied, the packetized elementary stream becomes nullified as it is assumed that the calculated output latency time on the condition is invalid under a predetermined condition.

12. The decoder device according to 9, wherein
even if the condition where a calculated output latency time is greater than or equal to the first threshold and less than or equal to the second threshold, is satisfied, the packetized elementary stream becomes nullified as it is assumed that the calculated output latency time on the condition is invalid under a predetermined condition.

13. A control method of a decoder device which retrieves a packetized elementary stream and a program clock reference value from a transport stream, and decides the timing of decoded reproduction output of the packetized elementary stream referring to a reproduction output time information appended to the packetized elementary stream while in a decoding reproduction process of the packetized elementary stream, the control method comprising:
 a counter value output step that counts in a predetermined count-up cycle without being synchronized by an adjustment control based on the program clock reference value;
 a table generation step for generating a table paring up a counter value at the time when the program clock reference value is received with the program clock reference value;
 a first difference information output step for outputting first difference information between a counter value at the time when reproduction output time information of the packetized elementary stream is referred to and a counter value in the table;
 a second difference information output step for outputting second difference information between reproduction output time information of the packetized elementary stream and a counter value in the table; and
 a latency time calculation step for calculating a latency time of the packetized elementary stream reproduction output from the first difference information and the second difference information.

* * * * *